United States Patent
Helfenstein

(10) Patent No.: US 11,198,563 B2
(45) Date of Patent: Dec. 14, 2021

(54) VIBRATORY CONVEYOR

(71) Applicant: K-Tron Technologies, Inc., Sewell, NJ (US)

(72) Inventor: Urs Helfenstein, Buchs (CH)

(73) Assignee: K-Tron Technologies, Inc., Sewell, NJ (US)

( * ) Notice: Subject to any disclaimer, the term of this patent is extended or adjusted under 35 U.S.C. 154(b) by 0 days.

(21) Appl. No.: 17/040,224

(22) PCT Filed: Mar. 20, 2019

(86) PCT No.: PCT/IB2019/052268
§ 371 (c)(1),
(2) Date: Sep. 22, 2020

(87) PCT Pub. No.: WO2019/193442
PCT Pub. Date: Oct. 10, 2019

(65) Prior Publication Data
US 2021/0016973 A1    Jan. 21, 2021

(30) Foreign Application Priority Data

Apr. 5, 2018   (CH) .................... 00441/18

(51) Int. Cl.
*B65G 27/32*   (2006.01)
*B65G 27/08*   (2006.01)
*B65G 27/30*   (2006.01)

(52) U.S. Cl.
CPC ............. *B65G 27/32* (2013.01); *B65G 27/08* (2013.01); *B65G 27/30* (2013.01); *B65G 2203/042* (2013.01)

(58) Field of Classification Search
None
See application file for complete search history.

(56) References Cited

U.S. PATENT DOCUMENTS

| 2,968,424 | A | * | 1/1961 | Lawson | ................. | B65G 27/00 |
| | | | | | | 222/161 |
| 4,405,043 | A | * | 9/1983 | Burghart | ................. | B65G 27/30 |
| | | | | | | 198/709 |

(Continued)

FOREIGN PATENT DOCUMENTS

| CH | 712253 A1 | 9/2017 |
| DE | 102015212538 A1 | 1/2017 |

(Continued)

OTHER PUBLICATIONS

PCT/IB2019/052268 International Search Report, dated Sep. 19, 2019.

*Primary Examiner* — William R Harp
(74) *Attorney, Agent, or Firm* — Wood Herron & Evans LLP

(57) ABSTRACT

The invention relates to a vibratory conveyor comprising a drive unit that generates a vibration movement during operation, and a conveying element arranged on the drive unit, wherein the drive unit comprises a support arrangement for the conveying element, which is mounted on a rear section on the carrier arrangement and has a freely extending section, and a spring-elastic vibration arrangement is provided on the front section of the conveying element, said vibration arrangement being arranged and designed in such a way that it oscillates with respect to the oscillation of the drive arrangement with phase displacement counter to the phase displacement of the conveying element.

10 Claims, 5 Drawing Sheets

(56) References Cited

U.S. PATENT DOCUMENTS

| | | | |
|---|---|---|---|
| 7,392,897 B2* | 7/2008 | Krell | B65G 27/08 198/760 |
| 10,961,058 B2* | 3/2021 | Helfenstein | B65G 27/26 |

FOREIGN PATENT DOCUMENTS

| EP | 1460006 A1 | 9/2004 |
|---|---|---|
| GB | 2426562 A | 11/2006 |
| JP | 2014201390 A | 10/2014 |

* cited by examiner

Fig 2

VIBRATORY CONVEYOR

FIELD OF THE INVENTION

The present invention relates to vibratory conveyors.

BACKGROUND OF THE INVENTION

Such vibratory conveyors are used in many industries, for all possible materials to the extent that they are at all conveyed by a vibratory conveyor. Thereby, the free-flowing materials are output to a conveying element, usually a conveying trough, which then performs a cyclic forward/upward movement with a corresponding backward movement—the vibration—whereby the individual particles of the material are thrown forward and simultaneously somewhat upward. The conveying element carries out the backward movement before the particles lie on it again so that, upon the next forward/upward movement, the particles can be conveyed one step further. In the case of small displacements, forward conveying can also take place by means of friction differences in the forward and backward movement.

Vibratory conveyors accordingly have a vibrating support arrangement for the interchangeable conveying element lying on it, being designed for example, depending on the material or other criteria, wherein the support arrangement is made to vibrate in the desired way by a drive arrangement.

Vibratory conveyors, in particular, those with a conveying trough, are difficult to design, are largely produced according to empirical findings, and, in trials, are compared to the frequency and throwing angle concerning the material to be conveyed. Some concepts work as desired, others show a poor level of conveying capacity, without being able to see the reasons behind this for the specific case at hand.

A disadvantage of the known vibratory conveyors is the time-delayed controllability of the mass flow output at the end of the conveying element or the conveying trough, which drifts more or less continuously without being regulated, either because of the irregular filling of the conveying element or because of other influences, which is problematic, particularly in the case of gravimetric dosing (if a vibratory conveyor is arranged on a weighing scale), but also in the case of volumetric dosage.

FIG. 1a schematically shows a vibratory conveyor 1 according to prior art as an example, which is mounted on the substrate 2 via a bearing arrangement, here elastic feet or bearings 3a, 3b. A drive unit 4 for a support arrangement 5 is apparent, on which, in turn, a conveying element (shown here as a conveying trough 6) is arranged, which is loaded via a filling channel 7 with bulk material 9 (e.g. grain, pharmaceutical products, plastic granules and powders of all kinds or metallic materials of all kinds, etc.) at its rear section 8a. The vibration movement of the support arrangement 5 vibrates the conveying trough 6 along with so that the bulk material 9' at the end of the front section 8b of the conveying trough 6 is released from the vibratory conveyor 1.

The drive unit 4 has a vibration drive 10, which is designed as an alternating-current-flow coil in the embodiment shown, which forms a periodic magnetic field during operation, thereby acting on a magnet 11, which, in turn, is arranged at the support arrangement 5 and moves this. The leaf springs 12a and 12b form drive levers for the support arrangement 5, are somewhat inclined with regard to the throwing angle and are set into vibrating motion indicated by the double arrows 13a,b by the vibration drive 10 so that the support arrangement 5 carries out an oscillation due to its cyclic parallel shift against a base plate 14 of the drive unit 4 which generates the mass flow m of the conveyed material 9 in the conveying direction x according to the throwing angle given by the direction of the double arrows 13a,b; see the coordinate system 15, whose x-axis points in the conveying direction and whose y-axis points vertically upward. The throwing direction therefore has a component toward the front in the x-direction, and upward in the y-direction.

The drive unit 4 has an operating frequency, which, in the case of a drive unit according to FIG. 1 (i.e. with leaf springs), preferably but not mandatorily, the resonance frequency corresponds to that of the drive unit 4 so that the leaf springs 12a, 12b oscillate at their present resonance frequency according to the formation of the drive unit 4. Alternatively, the drive unit can also have a mechanical drive so that a resonance frequency is not present—it is then operated with an operating frequency.

A vibratory conveyor results with a vibrating motion generating drive unit 4, and a conveying element arranged on the drive unit, wherein the drive unit 4 comprises a support arrangement for the conveying element, which is mounted on the support arrangement 5 via a section (8a) and has a freely extending section 8b.

FIG. 1b shows two diagrams 20 and 25 concerning the flow of the bulk material in the conveying trough 6 of the conventional vibratory conveyor 1 (FIG. 1) according to a simulation of the applicant concerning the behavior of such a vibratory conveyor as a whole, wherein the flow of the bulk material 9' is shown at the front end of section 8b (FIG. 1) of the conveying trough 6. In particular, the diagrams of FIG. 2 show the conditions in the case of an increase in the conveying rate with an increase in the mass flow from approx. 0.012 kg/s to 0.031 kg/s.

In diagram 20, curve 21 shows the velocity v in the conveying direction x (FIG. 1) of the bulk material 9' (as mentioned above, at the front end 8b of the conveying trough 9, see FIG. 1) over time in seconds (s). Within the time period 22, the vibratory conveyor is operated with a lower flow rate. At the time t=1 s, the conveying rate is increased by increasing the amplitude of the vibration movement, wherein the bulk material velocity $V_x$ (direction parallel to the conveying trough 6) rises practically without delay from the previous speed (section 22) to the new, stable speed in time period 24; see the jump in time period 23, in which the change of the velocity $V_x$ to the new value takes place.

Diagram 25 shows the mass flow m in kg/s in the conveying direction x (coordinate system 15, see FIG. 1) of bulk material 9' at the front end 8b of the conveying trough 6. Before the increase in the flow rate (time period 22), the mass flow is practically constant. After the increase in the flow rate at time t=1 s, however, the mass flow increases only sluggishly and stabilizes only gradually, with the result that the time period 27, in which the change of the mass flow takes place, lasts about 3.5 s. In time period 28, the mass flow is stable at the new value. A slow-changing mass flow means poor controllability, at least in terms of time.

According to the applicant's findings, the behavior of the mass flow over the length of the conveying trough 9 is the reason for the poor controllability of a vibratory conveyor according to FIG. 1a.

The analysis shows that two reasons for this can be: firstly, due to the vibration movement, the vibratory conveyor 1 tilts around its necessarily elastic supports 3a and 3b, which leads to the fact that the conveying trough does not only perform a translational vibration movement in the sense of arrows 13a and 13b (FIG. 1), but also a rotation corresponding to the tilting movement, indicated by the double arrow 17. This rotation, in turn, has the consequence that the throwing angle changes over the length of the conveying trough, because the conveying trough 6 does not always remain horizontally orientated due to the rotation, but also stands obliquely due to the rotation. Thus, the speed of the bulk material also changes over the length of the conveying trough 6 so that, according to the current rotation (and as long as this persists) of the conveying trough 6, local material height differences form across their length. If the rotation of the conveying trough changes due to the altered amplitude of the oscillation, the local material accumulations are shifted, so that a new, stable mass flow is created only after a few seconds.

Secondly, depending on the formation of the conveying trough 6, its freely extending section 8b tends to oscillate on the plane of FIG. 1a in such a way that the front end of section 8b moves up and down with relation to the support arrangement 5, see the double arrow 16 in FIG. 1a: the front end of the freely extending section 8b oscillates in the y-direction with relation to the support arrangement 5 and the rear section 8a mounted on it; the conveying trough 6 flexes periodically upward and downward. According to the applicant's findings, this flexural oscillation is not only the result of rotation (double arrow 17) but can also occur with a stable rotary conveyor. However, the type of oscillation depends on the design of the conveying trough itself and the material conveyed in it.

The effect of the vertically oscillating conveying trough 6 has comparable effects as in the case of rotation of the conveying trough: due to the deflection of the conveying trough, the throwing angle is not constant over its length, local material accumulations are formed, which in turn lead to poor controllability of the mass flow. Depending on the formation of the conveying trough, such oscillations can be weakly pronounced and thus less relevant or strongly pronounced and thus highly relevant. The diagrams created for the tilting or rotation of the vibratory conveyor due to the elastic bearing 3a, 3b (FIG. 1a) according to FIG. 1b are therefore meaningful or can be applicable to the case, even if a tilting of a vibratory conveyor is absent, but its conveying element itself starts to oscillate due to its specific formation, which leads to a deformation along with a changed throwing angle.

In WO 2017/158496, it has been proposed to avoid a tilting of the vibratory conveyor caused by the vibration movement by means of a suitable formation of the geometry of the drive arrangement (location of the centers of gravity of the components of the vibratory conveyor in conjunction with a guided bearing). In addition, it has been proposed to shift the bearing points of the leaf springs or the vibration-generating levers in such a way that the support arrangement is forced to make a tumbling motion instead of the purely translational vibration movement, which is to compensate the undesirable vertical oscillation of the freely extending section 8b of the conveying trough 6 compared to the support arrangement 5.

The disadvantage of such a vibratory conveyor lies in the fact that the controllability of the mass flow is improved, but it remains unexpectedly difficult. According to the applicant's findings, the corresponding formation of the support arrangement with adjustable bearing points still leads to a deflection of the conveying trough since the tumbling movement results in the rear section 8a being placed obliquely while the front section 8b should pass into a horizontal orientation, wherein this then oscillates with a different flexure depending on the amplitude of the vibration movement. Thus, the throwing angle is not constant over the length and changes depending on the flow rate, which in turn leads to the local material accumulations, which can change with the changed flow rate depending on the operating condition and negatively affect the controllability. In addition, a correct setting in the specific case of a vibratory conveyor running in a line is complex and difficult, for example, also because all operating states and possible conveying troughs must be anticipated and provided during the mechanical calibration of the bearing points.

Accordingly, it is the object of the present invention to create an improved vibratory conveyor with a short regulation time.

SUMMARY OF THE INVENTION

This problem is solved by a vibratory conveyor with the distinctive features as set forth herein.

By providing a spring-elastic vibration arrangement acting on the conveying element itself for maintaining a constant throwing angle, a very simple construction is available, which forms a unit with the conveying element and can therefore be easily calibrated for the most diverse conveying elements, even very long or very elastic conveying elements, with different bulk materials. This also applies to conveying troughs, which are not yet in use today, but could be desired by a line operator for the respective line. In addition, a vibration arrangement allows the throwing angle to be maintained over the entire length of the conveying element within a narrow range, which allows a very fast controllability of the mass flow.

Other preferred embodiments have the features of the dependent claims.

BRIEF DESCRIPTION OF THE DRAWINGS

The present invention is described in somewhat more detail in the following based on the figures.

The figures show:

FIG. 2 shows a view of an embodiment of a vibratory conveyor according to the invention 3D, whose basic structure corresponds to that of FIG. 1a, wherein the as a conveying trough 31 formed conveying element at its freely extending section 8b has a vibration arrangement 32. In the embodiment shown, this has a mass 33, which is fixed on this in a movable manner via a spring arrangement designed as a spring-elastic tongue 34 with a fastening arrangement 35 opposite the conveying trough 6 and forms a spring-elastic pendulum.

DETAILED DESCRIPTION OF THE INVENTION

Figure 1A:
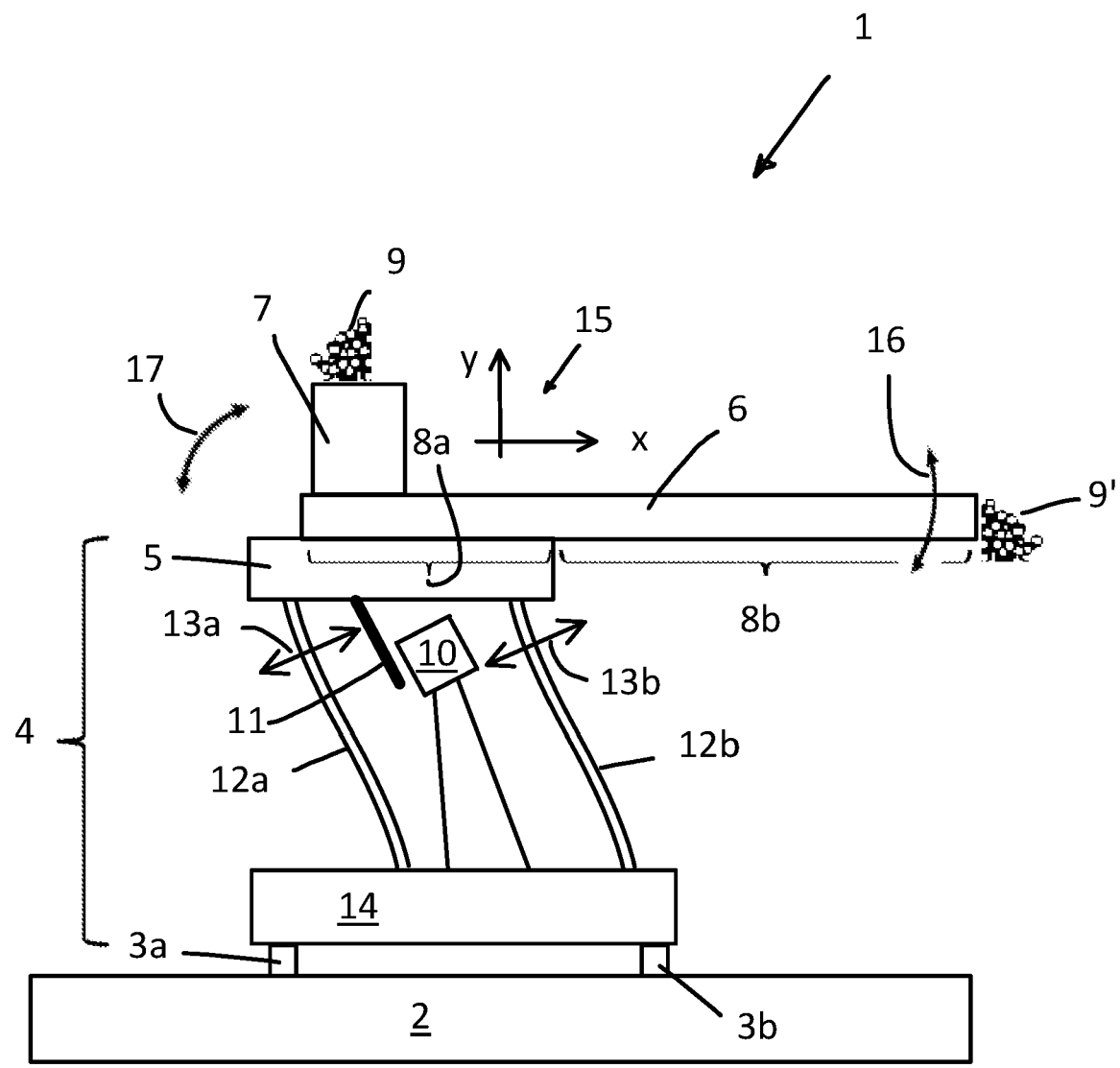
FIG. 1a a schematic representation of a state-of-the-art vibratory conveyor.
Figure 1B:
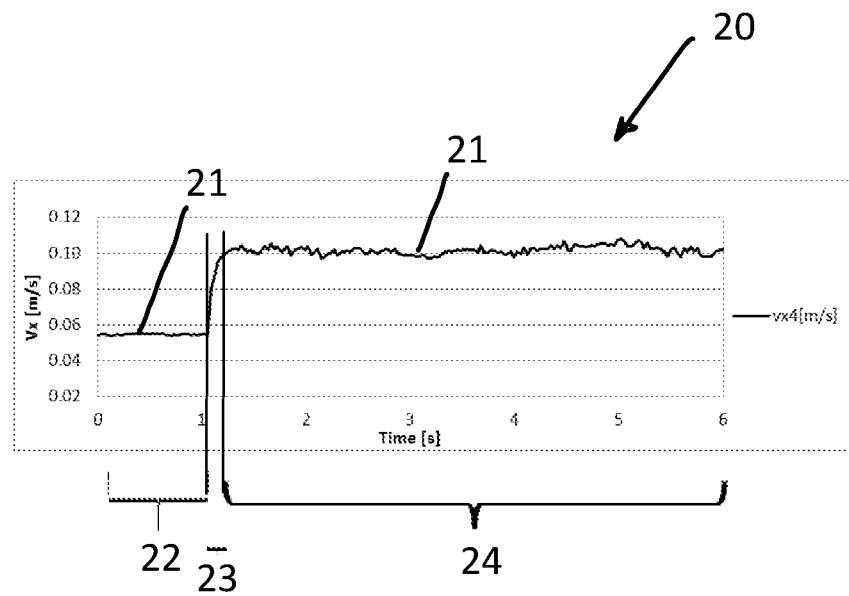
FIG. 1b two diagrams of the flow of the bulk material in the state-of-the-art vibratory conveyor according to FIG. 1, each before and after the change in the flow rate, FIG. 2 a view on an inventively modified vibratory conveyor, FIGS. 3a and 3b a diagram of the amplitudes and the phase shift of the harmonic oscillation, and FIG. 4 schematic a view on another embodiment of the vibratory conveyor of FIG. 2.
Figure 1B:
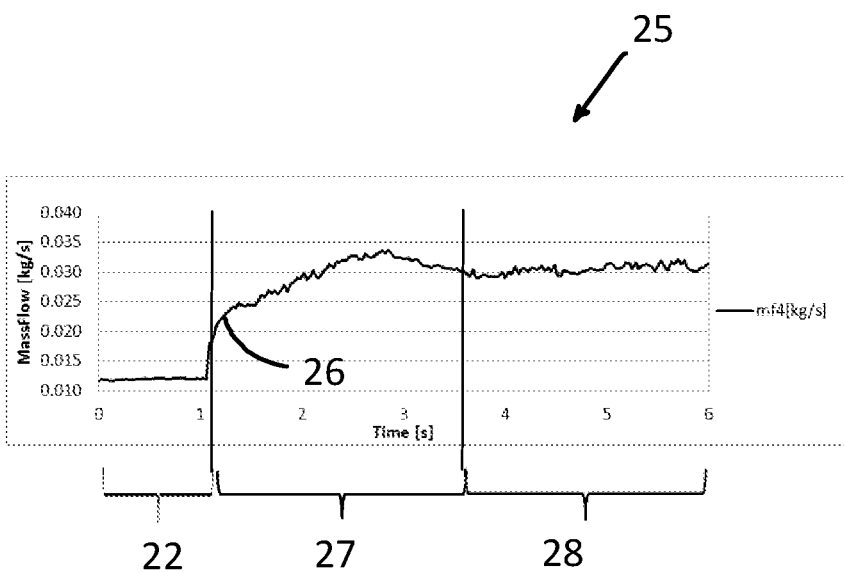

Due to the translational vibration movement of the support arrangement 5 (arrows 13a and 13b) the section 8b of the conveying trough 31 moves accordingly along with during operation of the vibratory conveyor 30, whereby the mass 33 opposite the conveying trough 6 and opposite the drive arrangement 4 starts an oscillation shown by the double arrow 36, however, with correct calibration, it does this in such a way that the front section 8b only carries out the translational movement in accordance with the arrow 13c, i.e. a flexure of the conveying trough 31 in the sense of the double arrow 16 (FIG. 1a) is essentially or completely absent. Thus, a change of the throwing angle over the length of the conveying trough 31 is reduced or prevented.

In this case, the conveying trough 31, the vibration arrangement 32 and the drive arrangement 4 each have a resonance frequency (in the case of the drive arrangement 4 possibly an operating frequency), which are all different from each other. It is often the case that the resonance frequency of the stiffly trained conveying trough 31 is higher than that of the drive arrangement, which is in the range of 60 Hz for many of the vibratory conveyors from prior art. Then, according to the invention, the vibration arrangement 32 shall be interpreted in such a way that its resonance frequency is lower than resonance or operating frequency of the drive arrangement 4. It should be noted, however, that according to the invention now also a soft conveying trough can be used, or an exceptionally long conveying trough, as this would be desired depending on the conception of the line in the specific case per se, but because of the poor controllability—without the exact reasons for this being known—cannot be provided.

Figure 3:
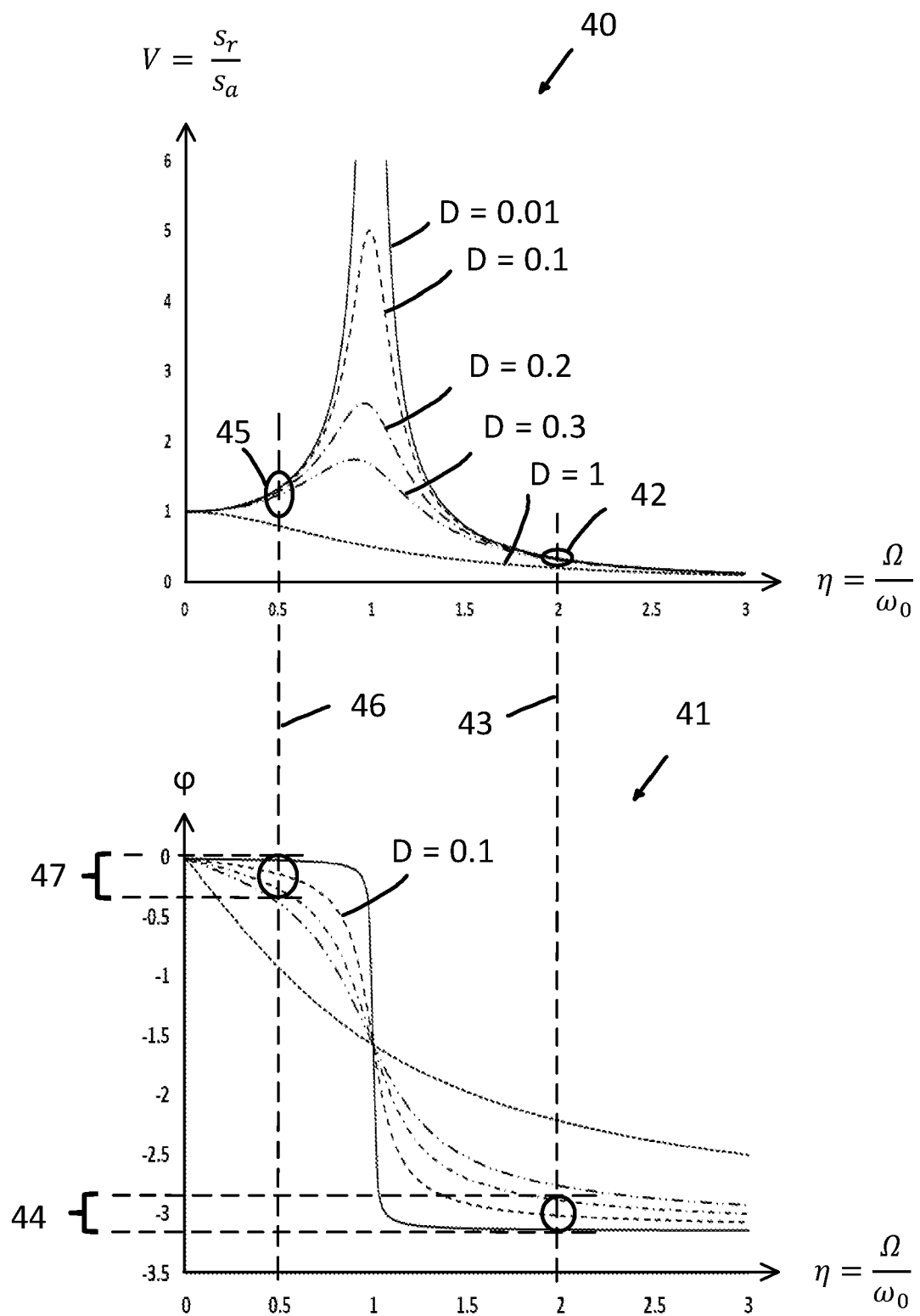

FIG. 3 shows the behavior of the conveying element 6 and the vibration arrangement 32 on the basis of the known diagrams 40, 41 for the forced harmonic oscillation of spring-mass systems. The conveying element represents such a spring-mass system, as well as the vibration arrangement 32. The diagrams 40.41 show different curves depending on the attenuation of the spring-ground system (from D=0.01 to D=1). At this point it should be noted that the attenuation of the conveying element and the vibration arrangement can be kept very low without any problems so that the operating points or operating ranges (see below) are on or near the steepest curves.

On the horizontal axis of both diagrams 40, 41, the ratio $$\eta = \frac{\Omega}{\omega 0}$$

is ablated, i.e. the ratio of the excitation frequency $\Omega$ to the resonance frequency $\omega_0$ of the spring-mass system (here the conveying trough 6 and the vibration arrangement 32). On the vertical axis, in diagram 40, the ratio $$V = \frac{S_r}{S_a} = \frac{1}{\sqrt{(1-\eta^2)^2 + 4D^2\eta^2}}$$

of the resulting amplitude $S_r$ of the spring-ground system to the stimulating amplitude $S_a$, is ablated, in diagram 41, the phase shift $\varphi$ between the stimulating oscillation and the thus excited oscillation of the spring-mass system. The phase shift $$\varphi = \arctan\left(\frac{-2D\eta}{1-\eta^2}\right),$$

where D is the attenuation factor and $$\eta = \frac{\Omega}{\omega 0}.$$

The support arrangement 5 (FIG. 2) vibrates at its operating frequency during operation, i.e. at this frequency, also its front section 8b opposite the rear section 8a and the pendulum mass 33 opposite the front section 8b respectively. It follows that all components vibrate at the same frequency, and one component animates the next one to oscillate, i.e. the rear section 8a the front section 8b and this then the pendulum mass 33. The stimulating oscillation $\Omega$ is thus always corresponds to the operational vibration of the support arrangement 5, while the resonance frequency $\omega_0$ of the conveying element or the vibration arrangement 32 is different from this according to the invention.

If the conveying trough has a resonance frequency of, for example, 120 Hz, which is therefore higher than the operating frequency of the support arrangement 5 (for example 60 Hz, see above); for the oscillation of the conveying trough 6, the ratio $$\eta = \frac{\Omega}{\omega 0} = 0.5$$

[do not cross out], see the operating range 45 in diagram 40 (the exact operating point depends on the attenuation of the conveying trough). Via line 46, it can be recognized that the phase of the front section 8b or its front end with relation to the rear end 8a (at the place of connection with the support arrangement 5) is close at $\varphi=0°$, see the range 47—the phase of the rear section 8a is, in comparison to the support arrangement 5, at 0° because it is rigidly connected to the support arrangement 5 (a rigid connection results in $\omega_0=\infty$, i.e.

$$\eta = \frac{\Omega}{\omega 0} = 0\bigg).$$

Figure 2:
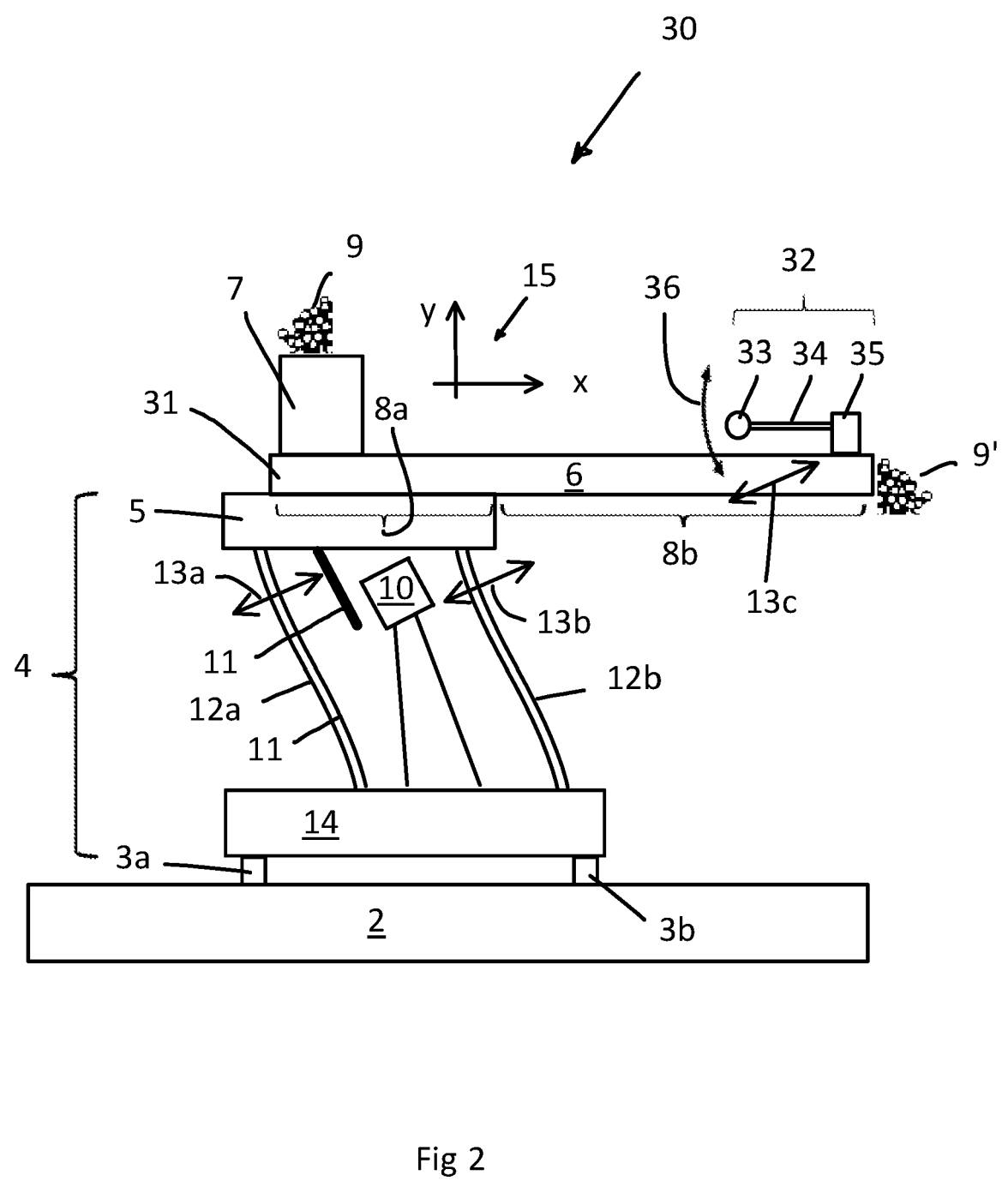
Figure 4:
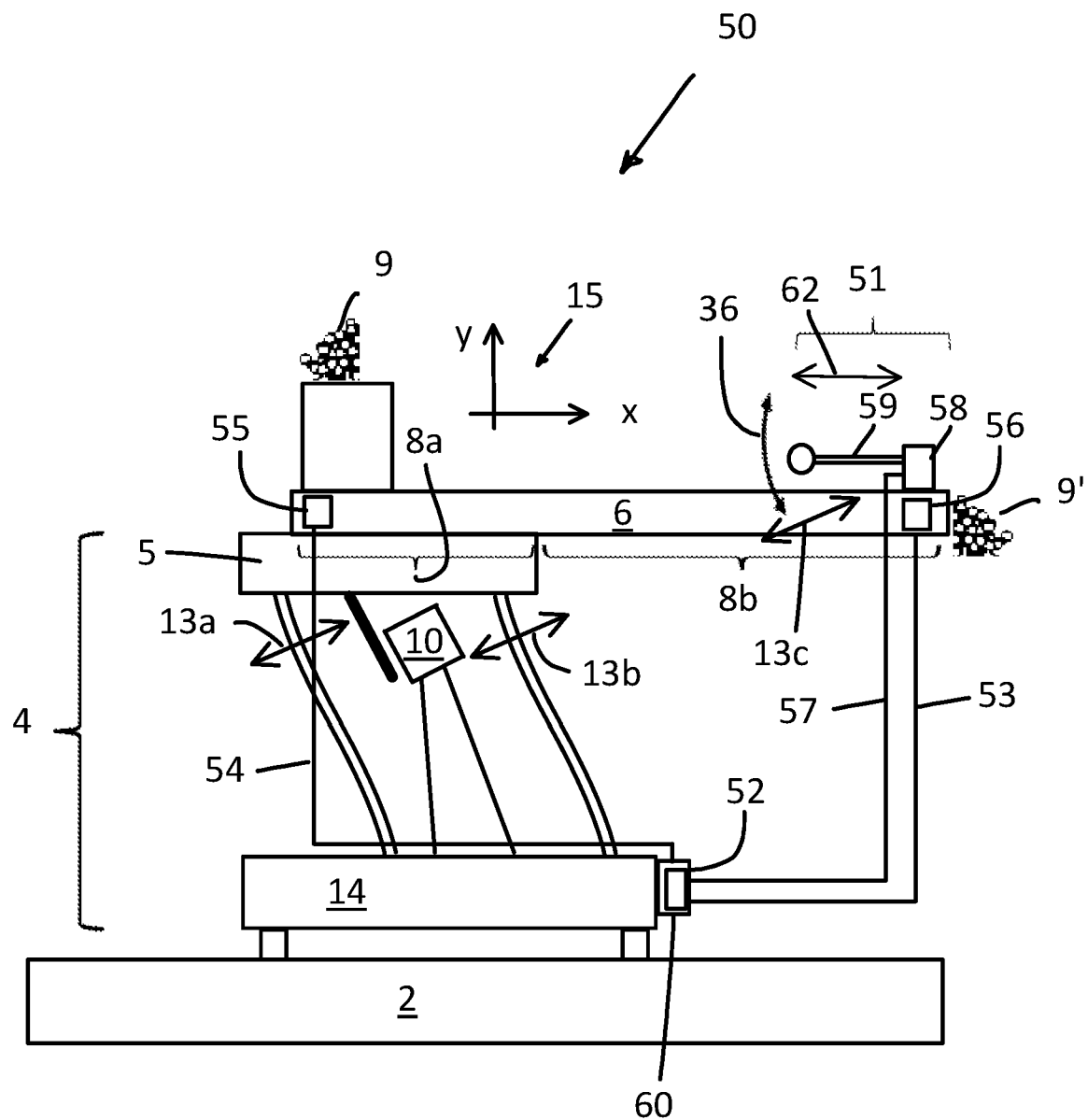

(In the embodiment shown in accordance with FIG. 2 or 4, the phase between the driving force between the magnet 11 and the coil of the drive arrangement 10 and the support arrangement is 5–90°, the force is 90° or $\pi/2$ in the resonance case when accelerated.)

If the vibration arrangement 32 has a resonance frequency of, for example, 30 Hz, which is thus lower than the operating frequency of the support arrangement 5 (for example 60 Hz, see above), the ratio is $$\eta = \frac{\Omega}{\omega 0} = 2,$$

see the operating range 42 in diagram 40 (the exact operating point depends on the attenuation of the conveying trough). Via line 43 it can be recognized that the phase 44 of the pendulum mass 33 with relation to the front end 8b (at the place of connection with the fastening to the trough 35) is close at $\varphi=-180°$, see range 44.

In this case, the pendulum mass 33 oscillates almost or in push-pull mode with relation to the front end of the conveying trough 6, with the result that it introduces a transverse force and a flexural momentum into the conveying trough via the spring-elastic tongue 34, which is opposite to its momentary deflection so that this deflection is reduced or disappears with appropriate calibration of the vibration arrangement 33 and the conveying element 6. This in turn means that the throwing angle across the length of the conveying element changes less or not at all, i.e. a quick controllability of the mass flow results.

This results in that a spring-elastic vibration arrangement is provided on the front section (8b) of the conveying element (6), which is arranged and designed in such a way that it oscillates with respect to the oscillation of the drive arrangement with a phase shift counter to the phase shift of the conveying element. Depending on the attenuation of the conveying element or the vibration arrangement, this phase shift is 180° or is close to 180°, but is so large that the controllability of the vibratory conveyor according to the invention is improved compared to an embodiment without a vibration arrangement.

If the conveying element has a lower resonance frequency than the frequency of the support arrangement 6, the operating ranges 42,45 in diagram 40 change. However, the conveying element and the vibration arrangement still oscillate in push-pull mode so that the deflection of the conveying element is reduced or disappears.

Furthermore, this results in that the natural frequencies of the conveying element 6 and the vibration arrangement 32 are different from the operating frequency of the support arrangement 4 and this is higher than the one of the natural frequencies, the other is lower. Being preferred, however, the natural frequency of the conveying element is higher than that of the vibration arrangement 32. A conveying element, in particular, if it is designed as a conveying trough, can generally be designed to be slightly comparably stiff with relation to the vertical direction y merely due to its trough-shaped cross-section, which results in a comparatively high resonance frequency. On the other hand, however, it is also the case that, in the case of longer conveying elements combined with corresponding material, a resonance frequency below the operating frequency may be the case. It should be noted here that with the help of the present invention conveying troughs or conveying elements with a larger length can be considered than was previously the case from the point of view of regulating the conveying quantity.

As shown in FIG. 2, the vibration arrangement 32 preferably has a pendulum mass 33 and a spring-elastic vibration arrangement 34, via which it is fixed at the conveying element 6. In this case, the spring-elastic vibration arrangement is furthermore preferably designed as a leaf spring or rod-shaped spring 34, which is arranged parallel to the conveying direction of the conveying element.

The vibration behavior of the conveying element, for example, a conveying trough 6, is complex, also because the vibration occurs in two directions (x and y, see FIG. 1a). Since the conveying trough 6 is stiff in x-direction, there is hardly a vibration component in the x-direction of the front end of the free section 8b, but essentially only a vibration in the vertical, i.e. in the y-direction, meaning the above-mentioned flexural oscillation. For the pendulum mass 32, nevertheless, this means that it moves on an elliptical path and the movements in the x-direction can have an influence. Although, according to the invention, already a first, standardized calibration of conveying element and vibration arrangement with regard to the operating frequency is also already advantageous and the vertical flexural oscillation of the conveying element is (only) reduced, in the specific case might a fine calibration be desirable, particularly in the case of pharmacological bulk materials. This fine calibration is according to the invention easy to carry out: for example in the vibration arrangement 32 very easy to make replacement of the pendulum mass 33 or an extension or shortening of the spring 34 allow a fine calibration with little effort so that the flexural oscillation of the conveying element is approximately or completely suppressed. For example, in the case of changing the length of the spring 34, the resonance frequency of the vibration arrangement changes so that its amplitude changes, see diagram 40 in FIG. 3. Thus, the amplitude of the vibration arrangement 32 can be calibrated to the conveying element in such a way that its flexural oscillation essentially disappears.

A simulation of the applicant led to the following result:

|  | Without vibration arrangement | With vibration arrangement |
| --- | --- | --- |
| Natural frequency of the vibration arrangement [Hz] | — | 55.27 |
| Operating frequency of the support arrangement [Hz] | 70.32 | 69.79 |
| Resonance frequency of the conveying trough [Hz] | 104.55 | 99.69 |
| Oscillation: Displacement of the support arrangement in the y-direction [mm] | 0.171 | 0.171 |
| Oscillation: Displacement of the front end of the conveying trough in the y-direction [mm] | 0.368 | 0.172 |
| Change of the y-component of the amplitude in the front/rear conveying element | 115.2% | 0.6% |
| Throwing angle of the support arrangement | 20° | 20° |
| Throwing angle of the conveying element at the front | 38.1° | 20.1° |
| Change of the throwing angle | 90.3% | 0.53% |
| Simulated change in the speed and height of the bulk material (material height difference in the conveying element) | 51.0% | 0.44% | which shows that the arrangement according to the invention can be coordinated in such a way that the influence of the flexural oscillation of the conveying element practically disappears.

The values for the simulated change in the velocity/height of the bulk material are based on the throwing angle over the length of the channel—in the case of the vibration movement (arrows 13a,b in FIGS. 2 and 4), the displacement of the conveying trough 6 in the x-direction is always assumed to be constant, while the displacement of the end of the front section 8b with relation to the rear section 8a in the y-direction without a pendulum arrangement 32 changes significantly; see above. In the simulation, the bulk material at the end of the front section without a vibration arrangement became 90.3% faster due to the change in the throwing angle, the material speed increases by 51%, wherein the material height correspondingly decreased by 51%. This change leads to worsening controllability; see above, the description of FIG. 2. According to the invention, a change of only 0.44% (instead of 51%) is now made, thus, there is an improved, meaning essentially instantaneous controllability.

FIG. 4 schematically shows an embodiment of a vibratory conveyor 50, which corresponds to that of FIG. 2, but has a device for automatic calibration of the vibration arrangement 51. Shown is a control 60 of the vibratory conveyor 50 with a control unit 52, which is connected via data lines 53,54 with a rear sensor 55 for the vertical movement of the rear section 8a and a front sensor 56 for the vertical movement of the free section 8b, as well as a data line 57 with an actuating drive 58 for the leaf spring 59.

The control unit 52 detects via the sensor 55 the vertical component of the vibration movement of the support arrangement 5 or the rear end of the conveying trough 6 and via the sensor 56 the vertical component of the vibration movement of the front end of the conveying trough 6. If these components deviate from each other by a specified threshold value stored in the controller 60, the control unit 52 generates a correction signal for the actuating drive 58, which thereby pulls in the leaf spring 59 somewhat (i.e. shortened) or extends (i.e. extended), see the double arrow 62. As explained above, the amplitude of the oscillation of the vibration arrangement 51 changes. The control unit 52 can now process this cycle continuously and thus reduce or prevent a drift in the calibration of vibration arrangement and conveying element 6 due to changing operating conditions. It is also possible that the control unit 52 in this way correctly coordinates a vibratory conveyor 50 that is approximate for a specific conveying task in operation, wherein the control accuracy can be calibrated by means of the specified threshold.

The sensors 55, 56 can be designed as simple accelerometers, such as those available under the designation MPU-6050 by TDK InvenSense. Depending on the construction of the vibratory conveyor 50, other existing data can also be used instead of the data of the rear sensor 55 since the movement of the support arrangement 5 is defined—in any case, however, the vertical movements of the rear section are compared with those of the front section of the conveying element and a deviation is corrected by means of regulating the vibration arrangement 51 until it falls below a specified target value. The person skilled in the art can easily determine such a control cycle for the specific case.

A vibratory conveyor results with a front sensor 56 for the vertical movement of the front section 8b of the conveying element 6 and with a control unit 60, which is designed to detect a deviation of the vertical movement of the front section 8b from the vertical movement of the rear section 8a from the data of the front sensor 56 during operation and to generate a correction signal for an actuator arrangement 58 of the vibration arrangement 51 so that the two vertical movements are mutually similar. Preferably, the vibratory conveyor has a rear sensor for the vertical movement of the rear section 8a of the conveying element. Being furthermore preferred, the front sensor 56, and being particularly preferred, the rear sensor 55 is designed as an accelerometer.

In an exemplary embodiment (not shown in the figures), the vibration arrangement has two vibrating masses, one on each side of the front end of the conveying trough. These can then also be arranged transversely from the conveying trough protruding leaf springs.

Alternatively, it is also according to the invention to hang a vibrating mass on a vertically arranged coil spring, and to arrange a vibration arrangement designed in such a way at the front end of the conveying element. It is also possible to arrange the vibrating mass between two springs. Numerous designs are conceivable for the vibration arrangement according to the invention. Thus, the vibrating mass may also be arranged on a transversely arranged to the conveying element leaf spring or a vertically arranged spiral spring. Likewise, a vertical leaf spring can be used, wherein a correction of the undesirable oscillation of the front end of section 8b would be made by the generated momentum in the conveying trough 6.

The invention claimed is:

1. Vibratory conveyor comprising a drive unit that generates a vibration movement during operation, and a conveying element arranged on the drive unit, wherein the drive unit comprises a support arrangement for the conveying element, which is mounted via a rear section on the support arrangement and has a freely extending section, wherein a spring-elastic vibration arrangement is provided on a front section of the conveying element, said vibration arrangement being arranged and designed in such a way so as to oscillate with respect to the oscillation of the drive unit with phase shift opposite to the phase shift of the conveying element.

2. Vibratory conveyor according to claim 1, wherein the resonance frequencies of the conveying element and the vibration arrangement are different from the operating frequency of the support arrangement and wherein the operating frequency is higher than one of the resonance frequencies and lower than the other of the resonance frequencies.

3. Vibratory conveyor according to claim 1, wherein the resonance frequency of the conveying element is higher than that of the vibration arrangement.

4. Vibratory conveyor according to claim 1, wherein the vibration arrangement has a pendulum mass and a spring-elastic pendulum suspension connecting the mass to the conveying element.

5. Vibratory conveyor according to claim 4, wherein the spring-elastic vibration arrangement has two masses, which are arranged on opposite sides of the conveying element.

6. Vibratory conveyor according to claim 1, wherein the spring-elastic pendulum suspension is formed as tongue, which is arranged parallel to the conveying direction x of the conveying element.

7. Vibratory conveyor according to claim 1, with a front sensor for the vertical movement of the front section of the conveying element and with a control unit, which is designed to detect a deviation of the vertical movement of the front section from the vertical movement of the rear section from the data of the front sensor during operation and to generate a correction signal for an actuator arrangement of the vibration arrangement so that the two vertical movements are mutually similar.

8. Vibratory conveyor according to claim 7, further comprising a rear sensor for the vertical movement of the rear section of the conveying element.

9. Vibratory conveyor according to claim 8, wherein the front sensor is designed as an accelerometer.

10. Vibratory conveyor according to claim 9, wherein the rear sensor is designed as an accelerometer.

\* \* \* \* \*